United States Patent [19]

Palm

[11] Patent Number: 5,687,076

[45] Date of Patent: Nov. 11, 1997

[54] METHOD FOR ADJUSTING SCALE FACTORS OF FUZZY LOGIC CONTROLLERS AND CONVENTIONAL NONLINEAR CONTROLLERS

[75] Inventor: Rainer Palm, Munich, Germany

[73] Assignee: Siemens Aktiengesellschaft, Munich, Germany

[21] Appl. No.: 500,874

[22] PCT Filed: Feb. 1, 1994

[86] PCT No.: PCT/DE94/00098

§ 371 Date: Aug. 4, 1995

§ 102(e) Date: Aug. 4, 1995

[87] PCT Pub. No.: WO94/18612

PCT Pub. Date: Aug. 18, 1994

[30] Foreign Application Priority Data

Feb. 4, 1993 [DE] Germany ............... 43 03 234.6
Feb. 12, 1993 [EP] European Pat. Off. ........ 93102270
Jun. 9, 1993 [DE] Germany ............... 43 19 224.0

[51] Int. Cl.⁶ ............................................. G05B 13/00
[52] U.S. Cl. ........................... 364/148; 395/3; 395/61; 395/80; 395/900; 364/172; 364/274.6
[58] Field of Search .............................. 364/148, 149, 364/151, 154, 157, 162, 164, 165, 172, 274.6, 728.03–728.07; 395/3, 61, 80, 900, 903–904

[56] References Cited

U.S. PATENT DOCUMENTS

| | | | |
|---|---|---|---|
| 5,166,873 | 11/1992 | Takatsu et al. | 364/151 |
| 5,170,341 | 12/1992 | Sklaroff | 364/162 |
| 5,241,651 | 8/1993 | Ueda | 395/61 |
| 5,245,528 | 9/1993 | Saito et al. | 364/161 |
| 5,247,432 | 9/1993 | Ueda | 364/162 |
| 5,251,124 | 10/1993 | Matsunaga | 364/176 |
| 5,295,061 | 3/1994 | Katayama et al. | 364/157 |
| 5,396,416 | 3/1995 | Berkowitz et al. | 364/165 |
| 5,587,896 | 12/1996 | Hansen et al. | 364/148 |

OTHER PUBLICATIONS

L. Zheng, "A Practical Guide to Tune of Proportional and Integral(PI) Like Fuzzy Controllers", IEEE International Conference on Fuzzy Systems, 8. Mar. 1992, San Diego, USA, pp. 633–640.

A. Boscolo, "Computer Aided Tuning and Validation of Fuzzy Systems", IEEE International Conference on Fuzzy Systems 1992 San Diego Mar. 1992, pp. 605–614.

T. Procyk et al., "A Linguistic Self–Organizing Process Controller", Automatica the Journal of IFAC the International Federation of Automatic Control, vol. 15, Jan. 1979, Great Britain, pp. 15–30.

M. Braae et al., "Selection of Parameters for a Fuzzy Logic Controllers", Fuzzy Sets and Systems 2 (1979), pp. 185–199.

D. Linkens et al., "Self–Organising Fuzzy Logic Control and the Selection of Its Scaling Factors", Transactions of the Institute of Measurement and Control, vol. 14, No. 3, 1992, Great Britain, pp. 114–125.

Peng, "Generating Rules for Fuzzy Logic Controllers by Functions", Fuzzy Sets and Systems 36 (1990), North–Holland, pp. 83–89.

"Fuzzy Logic in Control Systems: Fuzzy Logic Controller, Part II" By Chuen Chien Lee, IEEE Trans. on Systems, Man & Cybernetics, vol. 20, No. 2, pp. 419–435 Mar. 1990.

(List continued on next page.)

Primary Examiner—Emanuel T. Voeltz
Assistant Examiner—Tuan Q. Dam
Attorney, Agent, or Firm—Hill, Steadman & Simpson

[57] ABSTRACT

A method for adjusting scale factors of fuzzy controllers or conventional non-linear controllers provides that these scale factors are selected in such a way that a standardized cross-correlation function of a scaled input signal is optimized by means of an associated output signal.

6 Claims, 4 Drawing Sheets

OTHER PUBLICATIONS

"Self–Tuning of a Fuzzy Logic Controller Using a Cell State Space Algorithm" By S. M. Smith & D. J. Comer, Systems, Man & Cybernetics, 1990 Int'l. Conference, pp. 445–450 Jun. 1990.

"An Algorithm for Automated Fuzzy Logic Controller Tuning" By S. M. Smith & D. J. Comer, Fuzzy Systems, Int'l. Conference 1992, pp. 615–622 Feb. 1992.

"Performance Evaluation of a Self–Tuning Fuzzy Controller" By Daugherity et al., Fuzzy Systems, Int'l. Conference 1992, pp. 389–397 Feb. 1992.

METHOD FOR ADJUSTING SCALE FACTORS OF FUZZY LOGIC CONTROLLERS AND CONVENTIONAL NONLINEAR CONTROLLERS

BACKGROUND OF THE INVENTION

1. Field of the Invention

The present invention relates generally to a method for adjusting scale factors of fuzzy controllers or conventional non-linear controllers.

2. Description of the Related Art

Method for adjusting scale factors of fuzzy logic controllers and conventional non-linear controllers.

In most cases, fuzzy controllers (FCs) operate such that on the basis of crisp desired values and controlled variables manipulated variables which are likewise crisp are applied to the system (see FIG. 1). In this most frequent application, the fuzziness is limited exclusively to the controller, which is more robust than conventional controllers with respect to parameter variations and quick changes in desired value. It has been established that systems having a non-linear characteristic and complicated structure can be controlled better by FCs than by conventional controllers. Compared with adaptive controllers, FCs require a far lower outlay on implementation and are more robust with respect to uncertainties in the modeling. If the fuzziness is limited exclusively to the controller, by including the fuzzification or defuzzification respectively upstream or downstream of the FC, the latter can be considered relative to the outside as a conventional non-linear controller.

Operating FCs of this type requires the fuzzification of the input variables (for example error and error rate): each crisp input variable is assigned to a subset of degrees of membership which depend on a set, selected a priori, of membership functions. For the sake of simplicity, in most cases the membership functions are defined inside a standardized interval (a universe of discourse). Consequently, before the fuzzification, the input variables must be standardized (scaled) in such a way that they fit into the standard interval. An optimum selection of scale factors is therefore essential, because a poorly selected scaling leads to a displacement of the operating range to the edges of the standard interval. Generally suitable scaling rules are disclosed in the literature (M. Braae, D. A. Rutherford: Selection of Parameters for a Fuzzy Logic Controller, *Fuzzy Sets and Systems* 2 (1979), North-Holland pages 185 to 199; Peng Xian-Tu: Generating Rules for Fuzzy Logic Controllers by Functions, *Fuzzy Sets and Systems* 36 (1990), North-Holland pages 83 to 89; T. J. Procyk, E. H. Mamdani: A Linguistic Self-Organizing Process Controller, *Automatica Vol.* 15 (1979), *Pergamon Press Ltd.* pages 15 to 30).

In these methods, optimum scaling depends not only on the characteristics of the input variables, but also to a certain extent on the form and arrangement of the membership functions and naturally also on the system dynamics. The disadvantage of some of the previous methods resides in that they are based on the method of trial and error (A. Boscolo, F. Drius: Computer Aided Tuning and Validation of Fuzzy Systems. *IEEE Int. Conf. on Fuzzy Systems* 1992 San Diego March 1992, pages 605 to 614). The known methods, which operate using cost functionals, have the disadvantage that they are limited to PID-similar FCs (Li Zheng: A Practical Guide to Tune PI-like Fuzzy-Controllers, *IEEE Int. Conf. on Fuzzy Systems* 1992 San Diego March 1992, pages 633 to 640).

SUMMARY OF THE INVENTION

It is an object of the invention to provide a method for optimally adjusting scale factors in FCs. A fuzzy logic controller having crisp input variables and crisp output variables can be considered as a multidimensional, non-linear transfer element having upper and lower limits which is used in a control loop in which the system to be controlled has both linear and non-linear components. Fuzzy logic controllers are generally designed such that, on the one hand, they take account of the non-linearities and parameter fluctuations of the system by means of a high robustness. On the other hand, reference variables are to be adequately treated in accordance with their different quality, for example the aim should be an overproportional, non-linear approach to the remote target point and linear correction of errors in the vicinity of the target point. The controller input variable must then be scaled such that it fulfils both requirements.

This method is to apply both to FCs with simple tasks, which have their conventional counterpart in state controllers and non-linear controllers, and to sets of fuzzy decision rules to which conventionally crisp heuristic rules respond.

This and other objects and advantages of the invention are achieved by means of a method for adjusting scale factors of non-linear controllers having features in which the scale factors are selected in such a way that a standardized cross-correlation of a scaled input signal is optimized by means of an associated output signal. Advantageous developments of the invention are provided by the optimum value of the standardized cross-correlation being prescribed. The scale factors are determined by maximizing the absolute value of the standardized cross-correlation. Preferably, in addition to the scale factors an optimum offset of the input signal is also determined.

The input signals of the non-linear controller are scaled with the aid of scale factors, these scale factors being selected in such a way that a standardized cross-correlation of a scaled input signal by means of an associated output signal is optimized in such a way that, starting from large initial values of the scale factors, the latter are reduced step-by-step until the standardized cross-correlation is optimized.

This optimization is carried out under the constraint that the optimum value of the standardized cross-correlation must have sufficient sensitivity with respect to changes in the average input signal.

In the method according to the invention for adjusting scale factors of non-linear controllers, these scale factors are selected in such a way that a standardized cross-correlation function of a scaled input signal is optimized by means of an associated output signal.

One advantage of the method resides in that the adjustment of input variable scale factors can be undertaken only by considering the non-linear controller, without closing the control loop. The method can be applied to arbitrary non-linear controllers, that is to say also to conventional controllers.

DETAILED DESCRIPTION OF THE PREFERRED EMBODIMENTS

The invention is described in more detail below with the aid of preferred exemplary embodiments and of the figures.

The method is based on a method in non-linear automatic control engineering, in which for an input variable with a GAUSSIAN distribution a prescribed FC is mentally replaced under specific assumptions by a so-called equivalent amplification factor whose magnitude depends on the non-linear input/output characteristic of the FC. The aim of the method is to utilize linear system theory in the case of the presence of non-linear elements in the control loop. The suitable selection of the equivalent amplification factor therefore has a large influence on the system performance such as stability, transient response, etc. The equivalent amplification factor can be expressed by the standard deviation of the input variable signal and the input variable/output variable cross-correlation function. The basic assumption for the method according to the invention is that for steady-state input variables a specific component of their signal amplitudes in the vicinity of the operating point of the FCs is to be transferred linearly by the FC. A measure of the linear input/output dependence is the cross-correlation or the cross-correlation coefficient. This means that, when a specific linearity is required between the input variable and output variable, the standard deviation of the scaled input variables must be varied in such a way that the desired correlation coefficient is set. For a prescribed FC, the sole parameter for influencing the equivalent amplification is the scale factor for the input signal. The method according to the invention thus treats the optimum adjustment of scale factors with the aid of correlation functions. The advantage of this method resides in that adjusting input variable scale factors can be undertaken only by considering the non-linear FC without closing the control loop.

Equivalent amplification

Figure 1:
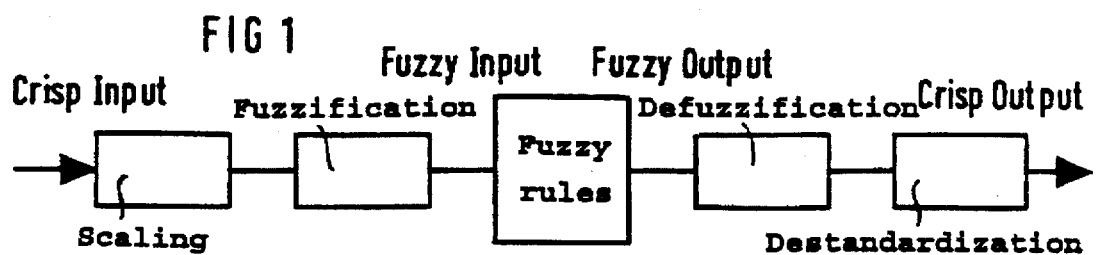
FIG. 1 shows the block diagram of a (fuzzy) logic controller.
Figure 2:
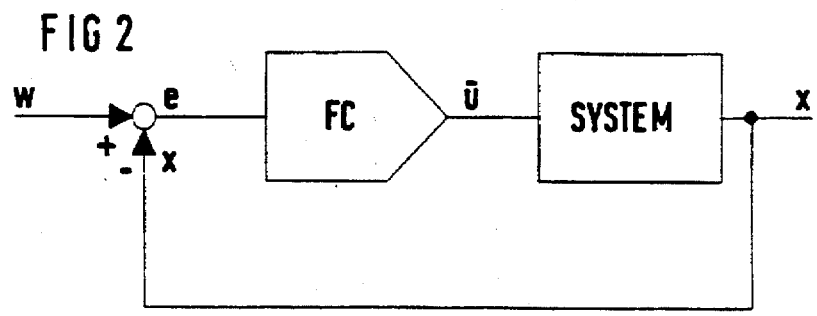
FIG. 2 shows a control loop having a (fuzzy) controller FC and the system to be controlled.

The system to be controlled by the FC may be assumed to be linear at the operating point and to have a low-pass characteristic (see FIG. 2).

Furthermore, the reference variable w may be assumed to have a GAUSSIAN distribution. Thus, for example, the control loop under consideration may be a servo control loop of a robot, which is embedded in a hierarchical control system and which is continuously offered desired-value changes on the basis of sensor information. Large desired-value changes are to occur more seldom than small changes, it being the case that the entire ensemble of the desired-value changes is to be assumed to have a GAUSSIAN distribution.

Because of the non-linear transfer characteristic, a non-GAUSSIAN distribution is obtained at the output of the FC. Because of its low-pass characteristic, we assume that the system to be controlled filters out all frequencies which distort the GAUSSIAN distribution, with the result that a signal having a GAUSSIAN distribution can again be expected at the output of the system. There are thus signals having a GAUSSIAN distribution at the summing point both for the reference variable w and for the controlled variable x and thus also for the error e=w−x. Given these assumptions, the scaled signal $e_s=(w-x)\cdot s_c$ ($s_c$=scale factor), too, is also of GAUSSIAN type. The terms description function for sinusoidal signals and equivalent amplification for GAUSSIAN signals are known from non-linear system theory (see H. Schlitt: *Stochastische Vorgänge in linearen und nichtlinearen Regelkreisen* (*Stochastic processes in linear and non-linear control loops*), Vieweg & Sohn GmbH, Verlag, Braunschweig 1968). The aim of these methods is to replace the non-linear element in a closed control loop computationally by a linear element whose amplification depends on the amplitude $e_0$ (for sinusoidal signals) or on the variance $\sigma^2 e$ (for signals having a GAUSSIAN distribution) of the controller input variables (control error).

Restricting oneself to GAUSSIAN signals yields $$K(\sigma_{e_s}) = \frac{R_{e,\bar{u}}(\sigma_{e_s})}{\sigma_{e_s}^2} \quad (1)$$

for the equivalent amplification, $e_s = s_c \cdot e$, $\bar{u}$ being the crisp or defuzzified manipulated variable (controller output variable), $$R_{e,\bar{u}}(\sigma_{e_s}) = E[(e_s(t) - E[e_s(t)]) \cdot (\bar{u}(t) - E[\bar{u}(t)])] \quad (2)$$

being the linear cross-correlation function for $\tau=0$, and $E[x(t)]$ signifying the expected value of a signal $x(t)$.

Input variable scaling

Let $\bar{u}$ be the output signal of the FC. The standard deviations of the scaled signal $e_s(t)$ and of the non-scaled signal $e(t)$ are connected in the same way as the signals themselves :

$$\sigma_{e_s} = s_c \cdot \sigma_e \quad (3)$$

It follows from (1) and (3) that $$K(\sigma_e) = \frac{R_{e,\bar{u}}(s_c \cdot \sigma_e)}{s_c^2 \cdot \sigma_e^2} . \quad (4)$$

Figure 3:
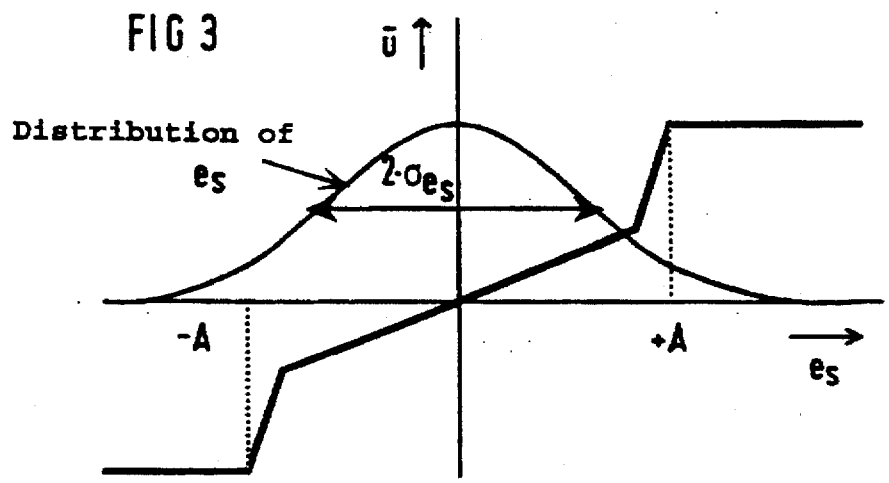
FIG. 3 shows a typical symmetrical transfer function of an FC.

Both the equivalent amplification K and the cross-correlation function $R_{e,\bar{u}}$ reach their maximum in the case for which the input variable and output variable are coupled to one another linearly. The standardized correlation function $$\tilde{R}_{e,\bar{u}} = \frac{R_{e,\bar{u}}}{\sigma_{e_s} \cdot \sigma_{\bar{u}}} \quad (5)$$

reaches its maximum at $$\tilde{R}_{e,\bar{u}} = 1 \quad (6)$$

and its minimum at $$\tilde{R}_{e,\bar{u}_{min}} = \sqrt{\frac{2}{\pi}} , \quad (7)$$

if the transfer characteristic of the controller is arranged symmetrically relative to the mean value $\bar{e}_s$ of the input variables (see FIG. 3).

Optimum scaling means: seeking an optimum $\sigma_{e_s}$ with respect to the interval $[-A, +A]$ of the FC.

Such an optimum scaling is achieved, for example, by means of the following method steps:

1. Starting the search procedure with a large scale factor $s_c$, which corresponds to a maximum standard deviation of $\sigma_{e_s} = \sigma_{e_s,max}$.

2. Stepwise variation of the mean value $\bar{e}_s$ by the addition of a change in conjunction with a constant standard deviation $\sigma_{e_s}$. This corresponds to a displacement of the probability distribution of the input signal with respect to the transfer characteristic of the FC along the $\bar{e}_s$-axis. The result is a curve $\tilde{R}(\bar{e}_s, \sigma_{e_s})$ having a maximum of $\tilde{R}(\bar{e}_s, \sigma_{e_s})_{max}$ at only one point, where $$\left| \frac{\Delta \tilde{R}}{\Delta \bar{e}_s} \right| \geq q > 0$$

for all $\bar{e}'_s$ in the neighborhood of $\bar{e}_s$ and $\sigma_{e_s}$=const.
q is thus a prescribed measure of the minimum sensitivity of the standardized cross-correlation to changes in the mean control error (the mean controller input variable).

3. Reduction of the scale factor $s_c$ by $\Delta s_c$ resulting in a reduction of $\sigma_{e_s}$ by $\Delta \sigma_{e_s}$, and repetition of the steps 1 and 2 for $\tilde{R}(\bar{e}_s, \sigma_{e_s} - \Delta \sigma_{e_s})$. Because the function $\tilde{R}(\bar{e}_s, \sigma_{e_s})\bar{e}_s$=const is monotonic, this results in a higher maximum than in the previous step:

$$\tilde{R}(\bar{e}_s, \sigma_{e_s} - \Delta \sigma_{e_s})_{max} > \tilde{R}(\bar{e}_s, \sigma_{e_s})_{max}. \quad (9)$$

4. The procedure is stopped for a value of $\sigma_{e_s,opt}$, where $$\tilde{R}(\bar{e}_s, \sigma_{e_s,opt}) \geq 1 - \alpha \quad \alpha \in (0,1) \quad (10)$$

with the condition (8). The value $s_{c,opt}$ corresponding to this value of $\sigma_{e_s,opt}$ is the optimum scale factor being sought.

Figure 4:
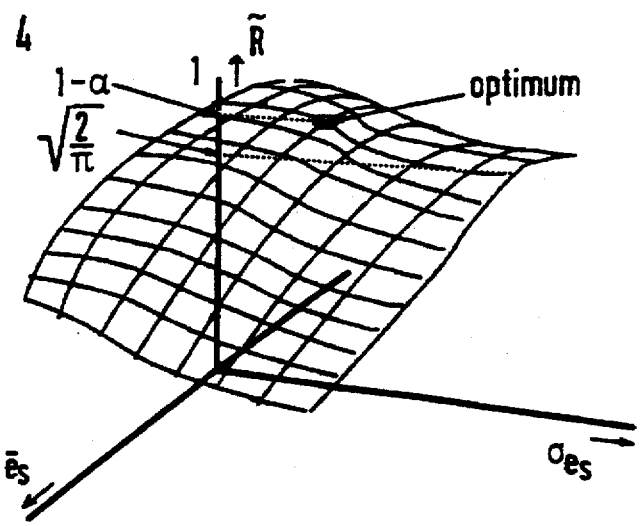
FIG. 4 shows a diagram of the typical variation in a standardized cross-correlation as a function of the mean error and the standard deviation thereof.
Figure 5:
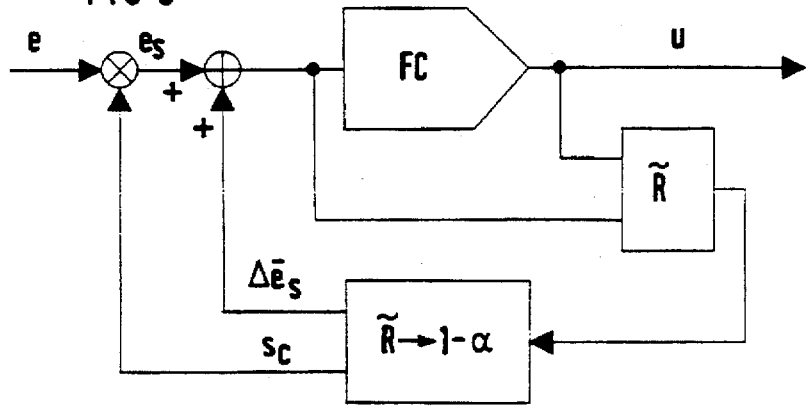
FIG. 5 shows a block diagram for the method according to the invention.

5. If condition (8) is not fulfilled, instead of a unique maximum the result is a plateau, and this corresponds to unsatisfactory utilization of the domain $[-A, +A]$ of the FC in the case of a given standard deviation $\sigma_e$ of the input signal. In this case, the scale factor $s_c$ must be increased, and steps 1 to 3 must, as the case may require, be run through with a smaller step size $\Delta s_c$ and thus also smaller values for $\Delta \sigma_{e_s}$ until condition (8) is fulfilled. FIG. 4 shows a typical characteristic, and FIG. 5 the corresponding block diagram. Other modes of procedure or modified algorithms for seeking optimum scale factors can be found without difficulty by the person skilled in the art with the aid of this example.

Figure 6:
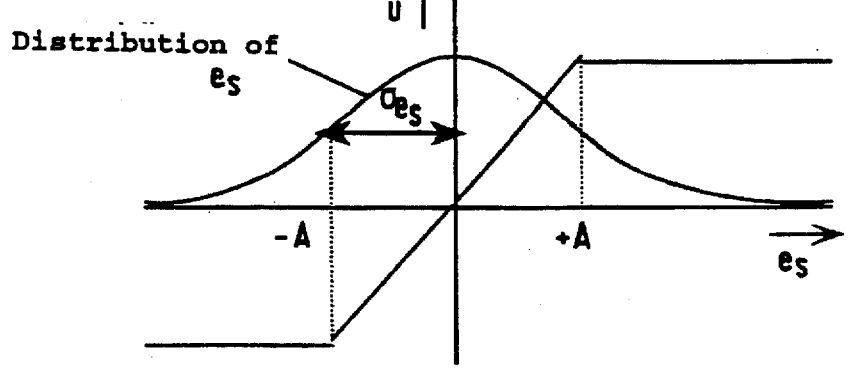
FIG. 6 shows the typical variation in the transfer function of a linear system having upper and lower bounds as well as a typical GAUSSIAN distribution of the input signals.

The free parameter $\alpha$ is preferably selected such that for a linear FC characteristic between upper and lower bounds (see FIG. 6) the standard deviation $\sigma_{e_s}$ of the input signal is equated to the interval A of the FC:

This means that given a non-linear characteristic (see FIG. 3), the scale factor $s_c$ automatically leads to a $\sigma_{e_s} < A$.

EXAMPLE

Figure 7A:
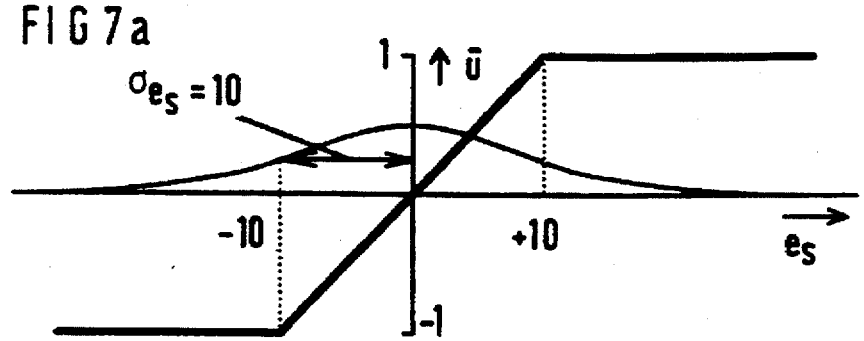
FIG. 7 shows two numerical examples of GAUSSIAN distributions of input signals for a linear and, respectively, a non-linear bounded system.
Figure 7B:
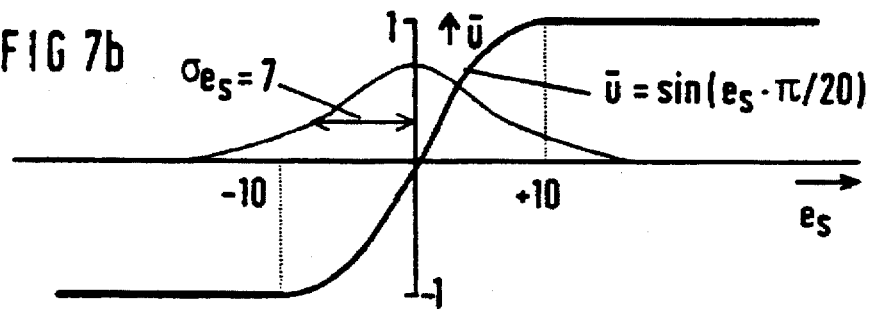

A standard deviation of $\sigma_e = 1$ is assumed. The result for a FC having a characteristic as shown in FIG. 7a is $$\tilde{R}(\bar{e}_s, \sigma_{e_s})|_{s_{e_s}=10} = 0.95,$$

and thus an $\alpha = 0.05$. This corresponds to a scale factor of $s_c = 10$. The result for an FC having a sinusoidal characteristic (see FIG. 7b) is a scale factor of $s_c = 7$ using the same $\alpha = 0.05$.

The aim of the following example is to show that the correlation technique can also be applied in cases in which an equivalent amplification is not at all important. It relates to input signals whose signs do not vary during the control process. The point here is that in the case of variation in the scale factor for the input variable, not only is there a variation in the scatter of the input signal, but its mean value is also displaced. This displacement can have the effect that instead of acting in the operating range of the controller the signals always act in the boundary ranges thereof, something which leads to faulty performance of the system because of the insensitivity of these ranges. The basic assumption is that the corresponding scale factor is optimally adjusted when in the case of a closed control loop a maximum statistical dependence is produced between the input variable and output variable of the controller:

$$abs(\tilde{R})_{\tau=0} \rightarrow max.$$

The absolute value of $\tilde{R}$ was taken in order to be independent of a reversal of sign in the control loop. It is shown in the following example that the method is also successful in the case of multiple input variables.

Demonstration example

Figure 8:
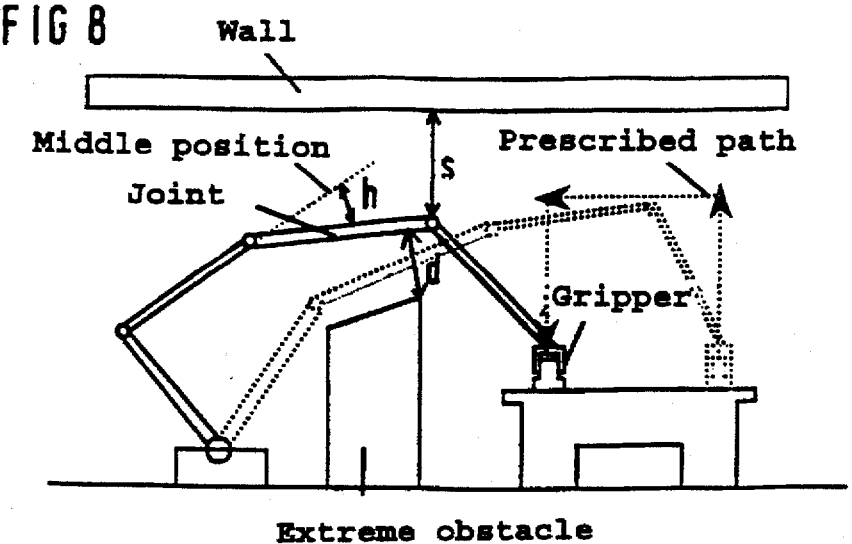
FIG. 8 shows a diagram of the conditions in the case of the movement of a redundant robot arm.

The following numerical example describes the kinematic control of a redundant manipulator arm (R. Palm: Control of a Redundant Manipulator Using Fuzzy Rules, *Fuzzy Sets and Systems* (1992), Vol. 45 No. 3, North-Holland, pages 279 to 298). The effector (gripper or tool) of the flat robot is to follow a prescribed path (see FIG. 8). The robot kinematics is constructed such that the manipulator is capable of avoiding both external obstacles and internal restrictions of the individual joints (for example, final positions).

In the present example, the movement of each joint is determined by the following constraints in addition to the prescribed task of the effector:

distance h from the middle position distance s from the wall distance d from the obstacle.

The distances h, s and d are determined by fuzzy attributes such as s=positive small and their membership functions. For each joint, a fuzzy rule generates a corresponding correction of the joint angle. The actions (joint corrections) z of each joint are likewise evaluated by means of fuzzy attributes such as z=positive big. The distances h, s and d are initially scaled in such a way that they fit into the predetermined standard intervals (universes of discourse).

The following fuzzy sets were formulated for the internal restriction of "scaled distance between the ith joint and its middle position" $H_{iN}$=h:

| | |
|---|---|
| h negative big: | HNB = $(\mu_{HNB}(h)/h)$, |
| h negative small: | HNS = $(\mu_{HNS}(h)/h)$, |
| h positive big: | HPB = $(\mu_{HPB}(h)/h)$, |
| h positive small: | HPS = $(\mu_{HPS}(h)/h)$, |
| $\forall h \in H$. | |

The following fuzzy sets were formulated for the external restriction of "scaled distance between the ith joint and a wall" $s_{iN}$=s:

| | |
|---|---|
| s big: | SIB = $(\mu_{SIB}(s)/s)$, |
| s small: | SIS = $(\mu_{SIS}(s)/s)$, |
| $\forall s \in S$. | |

The following fuzzy sets were formulated for the external restriction of "scaled distance between the ith joint and an obstacle" $d_{iN}$=d:

| d big: | DIB = $(\mu_{DIB}(d)/d)$, |
|---|---|
| d small: | DIS = $(\mu_{DIS}(d)/d)$, |
| $\forall d \in D$. | |

The following fuzzy sets were formulated for the "scaled output variable" $z_i=z$ with respect to the ith joint:

| z negative big: | ZNB = $(\mu_{ZNB}(z)/z)$, |
|---|---|
| z negative small: | ZNS = $(\mu_{ZNS}(z)/z)$, |
| z negative zero: | ZNZ = $(\mu_{ZNZ}(z)/z)$, |
| z positive big: | ZPB = $(\mu_{ZPB}(z)/z)$, |
| z positive small: | ZPS = $(\mu_{ZPS}(z)/z)$, |
| z positive zero: | ZPZ = $(\mu_{ZPZ}(z)/z)$, |
| $\forall z \in Z$. | |

All the membership functions $\mu$ vary exclusively within the standard interval h, s, d, z $\in$[MAX, MIN]. Outside this interval, the $\mu$-values are either 0 or 1. Furthermore, let all the fuzzy sets be normal, that is to say there is always an h, s, d or z with $\mu$=1.

The following set of rules was applied in order to generate a suitable movement for each joint, taking the external and internal restrictions into consideration:

| | |
|---|---|
| IF (SIS AND DIS AND (HNS OR HPS)) OR (SIS AND HNB AND DIB) | THEN ZNZ |
| IF (SIS AND HPB AND DIS) OR (SIS AND HPS AND DIB) | THEN ZNS |
| IF (SIS AND DIB AND (HNS OR HPS)) OR ((SIS OR SIB) AND HPB AND DIB) | THEN ZNB |
| IF SIS AND HNB AND DIS | THEN ZPZ |
| IF (SIB AND DIS AND (HPS OR HPB)) OR (SIB AND HNS AND DIB) | THEN ZPS |
| IF (SIB AND DIS AND (HNS OR HNB)) OR (SIB AND HNB AND DIB) | THEN ZPB |

The scaler output value was calculated via the center of gravity:

$$z_N = \frac{\int_{z_{min}}^{z_{max}} z \cdot \mu_c dz}{\int_{z_{min}}^{z_{max}} \mu_c dz} .$$

The MAX and MIN operators were used, respectively, for AND and OR. The correlation coefficient for the discrete case is as follows for the distance s:

$$\tilde{R}[s,z] = \frac{\sum_{i=1}^{n} s_i z_i - \frac{1}{n}\left(\sum_{i=1}^{n} s_i \cdot \sum_{i=1}^{n} z_i\right)}{\sqrt{\sum_{i=1}^{n} s_i^2 - \frac{1}{n}\left(\sum_{i=1}^{n} s_i\right)^2} \cdot \sqrt{\sum_{i=1}^{n} z_i^2 - \frac{1}{n}\left(\sum_{i=1}^{n} z_i\right)^2}}$$

Figure 9:
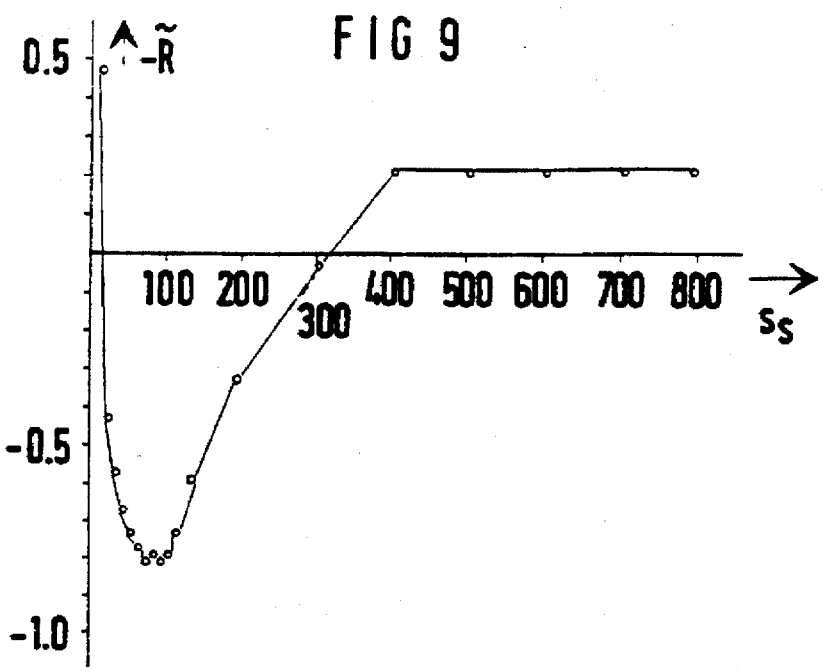
FIG. 9 shows simulation results of one demonstration example of the method according to the invention.

FIG. 9 shows the variation in the correlation coefficient $\tilde{R}$ as a function of $s_s$, the scale factor for s.

Figure 10:
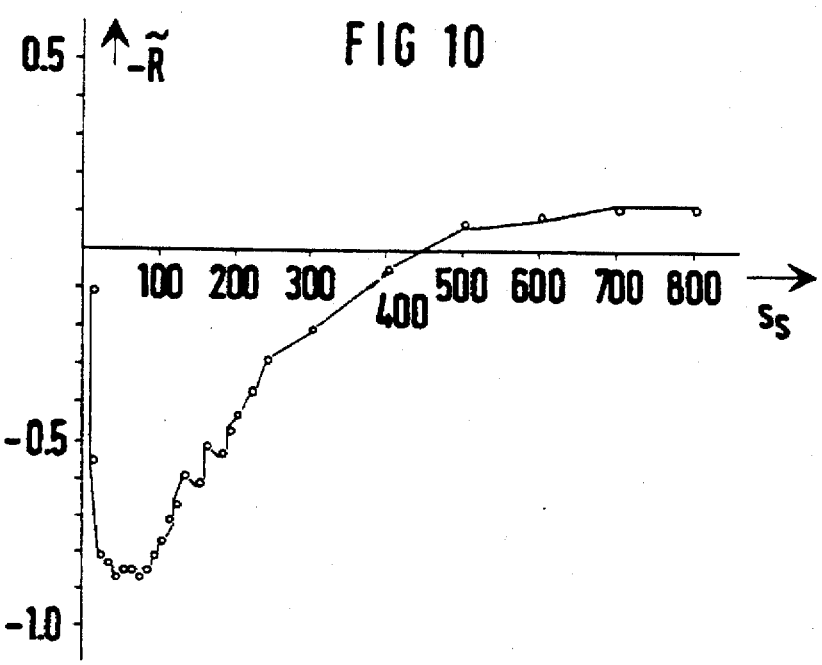
FIG. 10 shows simulation results of one demonstration example of the method according to the invention.

The other scale factors are $s_h$=20 and $s_d$=120. The peak of $\tilde{R}$ is at approximately $s_s$=80. FIG. 10 shows the same situation, but for $s_h$=100 and $s_d$=60. The peak of $\tilde{R}$ is, again, at $s_s$=80. FIG. 11 shows the correlation coefficient $\tilde{R}$ for $s_h$=20 and $s_d$=60, the peak of $\tilde{R}$ being once again at $s_s$=80. The result shows that despite different selection of the other scale factors $s_d$ and $s_h$ and a change, bound up therewith, in the $\tilde{R}(s_s)$-curve, the extreme value of $\tilde{R}$ is always located at the same $s_s$-point. Finally, this example illustrates the independence of the position of the maxima of the correlation coefficients.

Although other modifications and changes may be suggested by those skilled in the art, it is the intention of the inventors to embody within the patent warranted hereon all changes and modifications as reasonably and properly come within the scope of their contribution to the art.

I claims:

1. A method for operating a non-linear controller having scaled input signals, comprising the step of:

selecting the scale factors in such a way that a standardized cross-correlation of a scaled input signal is optimized by means of an associated output signal.

2. A method for operating a non-linear controller as claimed in claim 1, further comprising the step of:

prescribing the optimum value of the standardized cross-correlation.

3. A method for operating a non-linear controller as claimed in claim 1, further comprising the step of:

determining the scale factors by maximizing an absolute value of the standardized cross-correlation.

4. A method for operating a non-linear controller as claimed in claim 1, further comprising the step of:

determining an optimum offset of the input signal.

5. A method for operating a non-linear controller as claimed in claim 1, wherein the input signals of the non-linear controller are scaled with aid of scale factors, said scale factors being selected in such a way that a standardized cross-correlation of a scaled input signal by means of an associated output signal is optimized in such a way that, starting from large initial values of the scale factors, the scale factors are reduced step-by-step until the standardized cross-correlation is optimized.

6. A method for operating a non-linear controller as claimed in claim 1, wherein said optimization is carried out under a constraint that the optimum value of the standardized cross-correlation must have sufficient sensitivity with respect to changes in average input signal.

* * * * *